(No Model.)

J. DAIGNEAU.
BARK CUTTER.

No. 278,686. Patented June 5, 1883.

WITNESSES
E. K. Parker
H. L. White

INVENTOR
Jeremiah Daigneau
by atty
J. L. Newton

UNITED STATES PATENT OFFICE.

JEREMIAH DAIGNEAU, OF ST. HYACINTHE, QUEBEC, CANADA.

BARK-CUTTER.

SPECIFICATION forming part of Letters Patent No. 278,686, dated June 5, 1883.

Application filed March 20, 1883. (No model.)

*To all whom it may concern:*

Be it known that I, JEREMIAH DAIGNEAU, a citizen of the Dominion of Canada, residing at St. Hyacinthe, in the Province of Quebec, Canada, have invented an Improvement in Bark-Cutters, of which the following is a specification.

My invention relates to a new and improved machine for cutting bark in suitable lengths around a log or trunk of a tree. In peeling bark for tanning purposes or any other purpose such cuttings have commonly been done hitherto by the ax after felling the tree; but by my machine the work of cutting around the tree can be done much more expeditiously and with better results; and such is the object of my invention.

In obtaining bark the usual practice is, first, to fell the tree, and then measure off four feet, or the desired length, and then cut the bark around the trunk with an ax, and thus to measure and cut the bark the whole length of the tree-trunk. My machine consists of a long lever or bar, made of wood or any suitable material, having near one end a mortise or slot cut through the lever, and through this mortise I insert the shank of a knife-holder, and said shank is adjustable in the mortise and held there by a bolt or pin which passes through the bar and shank; the bar and knife-shank and knife together, or the machine, is somewhat in appearance and mode of use like what is known as a "cant-hook" for rolling logs.

That others skilled in the art may understand the nature and use of my invention, reference is hereby made to the accompanying drawings and letters of reference thereon, which are made a part of this specification, in which—

Figure 1:
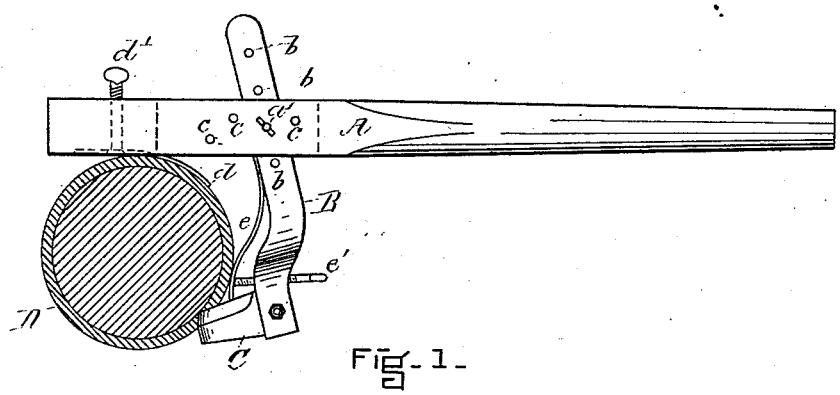
Figure 2:
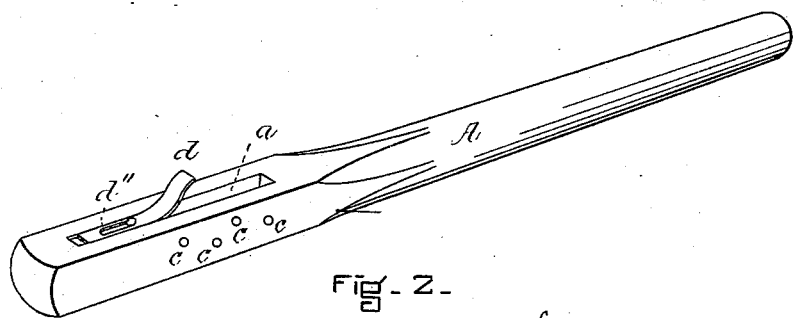
Figure 3:
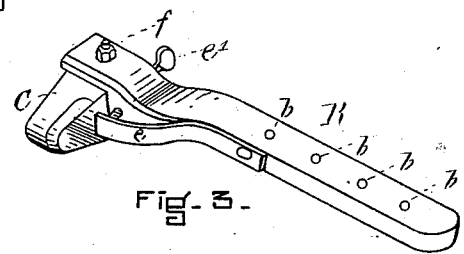
Figure 4:
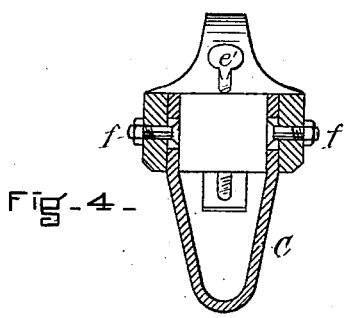
Figure 5:
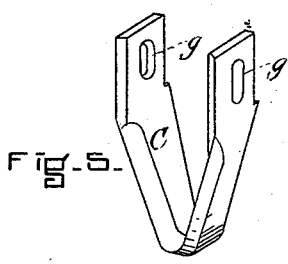

Figure 1 is a side elevation with a section of a tree-trunk to which the machine is applied. Fig. 2 is a view of the under side of the bar, the knife being removed. Fig. 3 is a side and bottom view of the knife and knife-holder and spring detached from the lever or bar. Fig. 4 is a cross-section of the knife-holder and knife, showing how the knife is held to the holder. Fig. 5 is a partial side view of the U-shaped knife detached from the knife-holder, showing the form of the knife, and the slots $g$, through which pass the screws $f$, as seen in Fig. 4.

The letter A represents the bar or lever; B, the knife-holder; C, the U-shaped knife; D, a section of a trunk of a tree; $a$, the mortise in the lever, and $a'$ a bolt passing through the lever and knife-holder; $b$, holes in the shank of the knife-holder; $c$, holes through the lever; $d$, a spring attached by a screw, $d'$, to said lever, having a slot, $d''$, at its point of fastening; $e$, a spring on said knife-holder, and $e'$ an adjustable screw operating said spring $e$; $f$, screws holding the knife to the knife-holder, and $g$ $g$ slots in the ends of the knife.

The lever or bar A in practice is five or six feet long, or may be of any convenient length, and is made of wood or any suitable material. It has holes $c$, (see Figs. 1, 2, 3,) through which passes the pin or bolt $a'$, and these holes pass through the mortise or slot $a$. These holes are for the purpose of adjusting the knife-holder to the size of the tree-trunk, as also are the holes $b$ in the shank of the knife-holder. The knife-holder (see Figs. 1, 2, and 3) is from one to three or more feet in length, and is made of metal, and pronged at one end for the purpose of holding the U-shaped knife. Said holder has a spring, $e$, on its under side, against which presses an adjustable screw, $e'$, which passes through the holder. (See Figs. 1, 2, 3, 4.) It will be observed that said spring, which is fastened to the lever by a screw, $e'$, presses upon the spring and adjusts it to the tree-trunk, and is also a guide for the thickness of the bark.

Fig. 4 shows the method of adjusting the knife to the holder. The screws $f$ pass through the slots $g$ from the inside, and are made fast by nuts on the outside. The slots $g$ serve to adjust the knife to the thickness of the bark by raising or lowering the knife. Fig. 1 shows how the machine is applied to the tree-trunk, whether the tree is standing or cut and fallen.

To save the bark before felling the tree I first cut around the trunk of the tree near the ground, and then above, the length of one cutting, and strip off the bark. The tree is then felled and trimmed. The workmen then pass along, one on each side of the trunk, for convenience and expedition of the work, and one workman takes the machine by the handle and applies it in the manner shown in Fig. 1, and cuts from the under side to the upper side of the trunk and passes the machine to the workman on the other side of the trunk, who cuts the remaining part in the same manner.

The advantage of this form of knife is readily seen. The cutting is a grooved cutting, and leaves the edges of the bark smooth and of even length, with but little waste. I may use, however, any form of knife-blade that will accomplish the cutting.

In small trees having thin bark a single or straight knife-blade might accomplish the cutting; but in thick bark the knife would be liable to break.

It will be observed that the spring $d$, attached to the lever A, and the spring $e$ to the holder B, partly clasp and press against the tree-trunk. They guide and aid the knife and steady the machine.

What I claim as my invention, and desire to secure by Letters Patent, is—

The combination of the lever A, provided with the pin-holes $c$ and the mortise $a$, through which is admitted a knife-holder, and the spring $d$, which clasps the log, and is held and adjusted to said log by a screw, $d'$, the pin $a'$, which is admitted through the holes $c$ in the lever A and unites the lever and the knife-holder, the knife-holder B, which is provided with holes $b$, and when inserted through the mortise $a$ is held there by the pin $a'$, and having also a spring, $e$, which is adjusted to the log by a screw, $e'$, and the U-shaped knife C, which is fastened to the knife-holder B by means of adjustable screws $f$, which pass through slots $g$ in the knife and through the knife-holder B, all parts being combined substantially in the manner and for the purpose shown and described.

JEREMIAH DAIGNEAU.

Witnesses:
 J. L. NEWTON,
 JOHN H. WILLIAMS.